March 24, 1953  E. B. LUMBARD  2,632,724
METHOD FOR BONDING HOLLOW PLASTIC BODIES
Filed Jan. 10, 1948
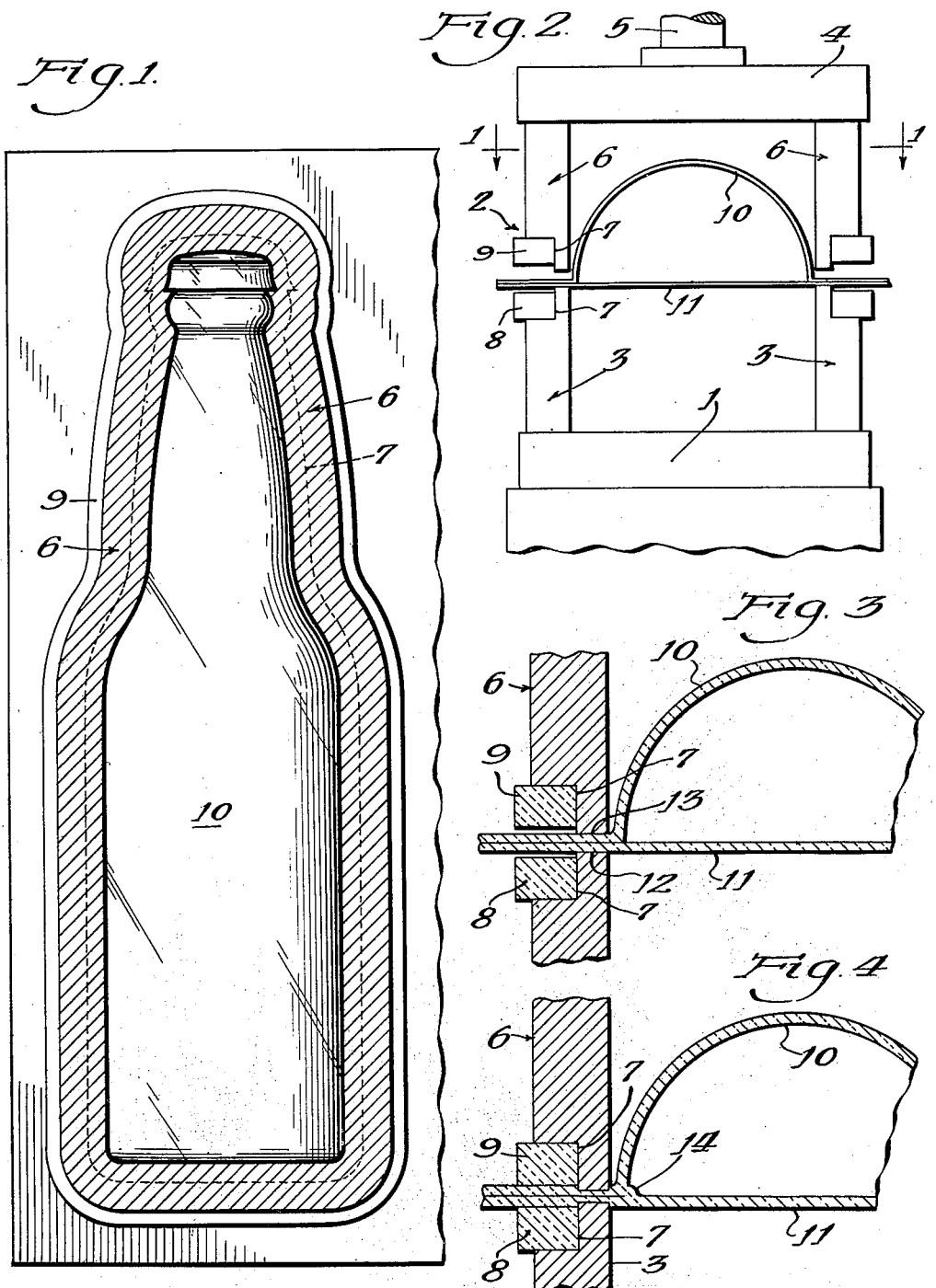
Inventor:
Edward B. Lumbard
By: Lee J. Gary
Attorney Patented Mar. 24, 1953

2,632,724

UNITED STATES PATENT OFFICE 2,632,724

METHOD FOR BONDING HOLLOW PLASTIC BODIES

Edward B. Lumbard, Chicago, Ill., assignor to L. A. Goodman Mfg. Company, Chicago, Ill., a corporation of Illinois Application January 10, 1948, Serial No. 1,566

4 Claims. (Cl. 154—83)

This invention relates to improvements in a method and apparatus for sealing or bonding hollow plastic bodies, and refers particularly to a method and apparatus for so sealing or bonding the component preformed parts of such bodies as to position the effective bond along the line of the seam within the hollow body.

Many types of hollow bodies constructed of plastic sheet material have heretofore been made. These bodies are usually made in preformed parts, the sheets comprising the parts being moulded or formed in suitable dies. Subsequently, the parts are joined together along their edges to complete the hollow plastic body.

Difficulty has heretofore been encountered in joining the edges of the component parts. The usual method of making the juncture is to employ a solvent for the plastic material to soften the edges of the parts and make them adherent and then join the softened edges together. This method is unsatisfactory for a number of reasons among which may be mentioned, that it is an expensive procedure, the procedure is slow, and the results obtained are frequently not satisfactory in that the junctures or portions thereof are weak.

Making the juncture by the use of heat and pressure has also been resorted to. However, in joining the parts in this manner, as heretofore practiced, a seam is formed at the line of juncture which extends outwardly from the surface of the body. This seam cannot be trimmed flush with the surface of the body because the essential strength of the juncture resides in the projecting seam and if it were trimmed away the parts would come apart for lack of proper bonding.

In the present invention thermoplastic sheet material is employed in forming the component parts of the body and the edges of said parts are joined by heat and pressure. However, the joining is so contrived that the seam may be made substantially flush with the outer surface of the body.

Briefly described, the present invention comprises a pair of opposed heated dies, the dies being heated by high frequency current. Each die carries a block of insulating material which is nonfusible at the temperatures employed, the block for each die traversing the contour of the die and being disposed outwardly from the heated, pressing portion of the die, the latter portion of the die being disposed adjacent the surface of the body being formed. The operation of the device is such that the edge portions of the two sheets forming the parts to be joined are squeezed and heated between the two dies. The blocks adjacent the heated portions of the dies are offset with respect to the pressing surfaces of the dies and also subject the two sheets to pressure. However, the pressure exerted by the blocks is resisted by relatively cold portions of the sheet stock and, hence, the sheets are not materially reduced in thickness between the blocks. The portions of the sheets between the two heated die portions are reduced in thickness and by virtue of the pressure established by the blocks, the material displaced by the hot die portions is free to move inwardly only at the inner portion of the joint, forming a bead along the inner line of the joint which bridges the joint and forms the essential strength-giving portion of the joint. Thus the die-pressed portions of the joint may be trimmed substantially flush with the surface of the body without weakening the joint.

Other objects and advantages of the present invention will be apparent from the accompanying drawing and following detailed description.

In the drawing,

Fig. 1 is a plan sectional view of the top die taken on line 1—1 of Fig. 2.

Fig. 2 is a diagrammatic elevational view of the cooperating dies.

Fig. 3 is a fragmentary sectional view, illustrating the dies making initial contact with the sheets.

Fig. 4 is a similar view illustrating the dies in final contact with the sheets.

Referring in detail to the drawing, 1 is a base plate of a die press 2. A die member 3 is supported upon the base plate 1, which, for purposes of illustration, is shown and described as so configured as to join the edges of two plastic sheets to form a simulated bottle. Of course, it is to be understood that the plastic body formed may take any desired configuration.

A movable platen 4 is positioned above the base plate 1, said platen being carried by piston rod 5 which may be actuated by any source of power (not shown), such as hydraulic, pneumatic, mechanical power or the like. A die member 6 is carried by the platen 4 and is coextensive and disposed in vertical alignment with the die member 3.

The die members 3 and 6 comprise the open terminals of an electric circuit carrying high frequency current, the source and connections thereto not being shown. Such high frequency heated die presses are well known in the art and per se comprise no part of the present invention.

The working edges of the die members 3 and 6 are corner notched, as at 7 in Figs. 2, 3 and 4, said notches traversing the entire contour of the dies, as shown best in Fig. 1. Blocks 8 and 9 are, respectively, disposed in the notches 7 of the lower and upper die members 3 and 6, and extend throughout the contour of the dies.

The hollow plastic body shown and described herein comprises two component parts, a preformed front sheet 10 and a flat back sheet 11, each sheet being constructed of a thermo-plastic material, such as, cellulose acetate, butyrate, vinyl chloride, vinyl acetate or like plastic sheet material which may be softened by the application of heat at moderate temperatures, that is, temperatures in the neighborhood of about 275° to 425° F. and can be made to flow under pressures of about 1,000 to 1,500 pounds per square inch.

The blocks 8 and 9 comprise an insulating material and may comprise a thermosetting resin such as a phenol formaldehyde resin or a mixture thereof with fibres. Of course, any material having properties of electrical insulation, relatively poor heat conduction properties, and which will not be charred or rendered plastic at the operating temperatures, may be employed.

The dimension of the depth of each notch 7 is greater than the depth dimension of blocks 8 and 9 positioned therein, the difference depending in part upon the thickness of the sheet material and the degree of compression desired. For example, for sheets of about .015 to $\frac{1}{8}$ inch in thickness, a difference in depth dimensions of the blocks and notches may be equal to about one-half the thickness of the sheet used.

It will readily be seen that the opposed faces of the blocks 8 and 9 will be offset with respect to opposed faces 12 and 13, respectively, of the die members 3 and 6, and when the die member 6 descends, the sheet stock between faces 12 and 13 will be compressed first while the opposed faces of the blocks 8 and 9 are still spaced from the sheets.

Simultaneously with the initial pressing of the sheet stock by the die faces 12 and 13, said stock will be heated between said faces. As the pressing continues, the sheet stock being pressed is heated rapidly by the high frequency current and the sheet stock will become softened and will be displaced by the opposed die faces. At this period the opposed faces of the relatively cold blocks 8 and 9 will begin to establish pressure upon the sheet stock immediately outside the severely pressed and heated portion of the stock. In view of the fact that the sheet stock between the blocks is relatively cold and the blocks operate over a greater surface area of the sheet stock than do the die faces, said stock will not be materially displaced and will resist any movement of the adjacent severely compressed hot stock in an outward direction.

Hence, the hot displaced stock, following the path of least resistance, will move inwardly and a bead 14 will be formed which is constituted from, and will make an integral bond with the upper and lower sheets 10 and 11. This bead is coextensive with the contour of the dies and, hence, with the contour of the body being formed. In view of the fact that the bead 14 will constitute the essential bond between the sheets, the edges of the sheets at the seam can be trimmed substantially flush with the surface of the hollow article without weakening the bond.

The blocks 8 and 9 in addition to their function in directionalizing the flow of the heated and compressed sheet stock, will also function as stops to control the extent of compression exerted by the die faces 12 and 13. The compressive power for the machine can be adjusted so as to exert a predetermined maximum pressure. In view of the fact that the pressing faces of the blocks act over a greater area of sheet stock than do the die faces and that the sheet stock acted upon by the block faces is relatively cold and immobile, the depth to which the die faces 12 and 13 sink into the stock will be essentially controlled by the compressive resistance offered by the sheet stock upon which the blocks act.

It will be apparent that the present invention can be employed in the manufacture of numerous types of hollow plastic bodies constructed of preformed plastic relatively thin sheet material, such as hollow plastic toys, ornamental decorations, ping pong balls and the like. Hence, it is not intended that the invention be limited to the production of the simulated bottle herein described.

I claim as my invention:

1. A method of bonding preformed component parts of bulbous hollow bodies constructed of thermoplastic sheet material which comprises disposing the edge portions of said parts in face to face juxtaposed position, subjecting the edge portions adjacent the bulbous surface of at least one of said preformed parts to heat to soften said plastic material and pressure to laterally displace said softened material and form a bead of said material at the juncture of said edge portions within the hollow body, and subjecting those edge portions remote from the bulbous surface of said preformed parts and adjacent said heated portion to relatively lower pressure at relatively lower temperature to block lateral displacement of said softened material away from the bulbous portion of said preformed parts.

2. A method of bonding preformed component parts of hollow bodies constructed of thermoplastic sheet material which comprises disposing the edge portions of said parts in face to face juxtaposed position, subjecting an area of said edge portions spaced from the surface defining said hollow body to substantially cold relatively low pressure, subjecting said edge portion between said aforementioned area and said surface to heat to soften said plastic material, and simultaneously subjecting said softened portion to pressure to displace said softened material inwardly of said body to form a bead of said material along the line of juncture of said juxtaposed edge portions to bond the edge portions together.

3. A method of bonding preformed component parts of bulbous hollow bodies constructed of thermoplastic sheet material which comprises disposing the edge portions of said parts in face to face juxtaposed position, subjecting an area of said edge portions spaced from the curved surface defining a portion of said bulbous hollow body to relatively high normal pressure, subjecting said edge portion between said aforementioned area and said curved surface to heat to soften said plastic material, and simultaneously subjecting said softened portion to normal pressure to displace said softened material laterally inwardly of said body and along the line of juncture of said juxtaposed edge portions to form a bead between said edge portions and along said line of juncture to bond within said body integrally said portions together.

4. A method of bonding preformed component parts of hollow bodies constructed of thermoplastic sheet material having relatively flat defining edge portions which comprises disposing the edge portions of said parts in face to face juxtaposed position, subjecting areas of the edge portions adjacent the surface of said preformed parts to heat to soften said plastic material and to pressure to laterally displace said material when it is softened and rendered flowable by said heat, then subjecting other areas of said edge portions remote from said surface of said preformed parts and adjacent said heated portion to relatively cold pressure when the heated material reaches a substantially flowable state to substantially block lateral displacement of the heated softened material away from said preformed parts and cause substantial displacement of said heat softened material toward said preformed parts to form a bead of said material along the line of juncture of said edge portions within said body.

EDWARD B. LUMBARD.

REFERENCES CITED

The following references are of record in the file of this patent:

UNITED STATES PATENTS

| Number | Name | Date |
|---|---|---|
| 762,063 | Kepler | June 7, 1904 |
| 1,139,341 | Cigol | May 11, 1915 |
| 1,869,550 | Dorogi | Aug. 2, 1932 |
| 1,917,929 | Duffy | July 11, 1933 |
| 2,117,452 | Robinson | May 17, 1938 |
| 2,140,692 | Daly | Dec. 20, 1938 |
| 2,167,869 | Bogolowsky | Aug. 1, 1939 |
| 2,373,899 | Lejeune | Apr. 17, 1945 |
| 2,390,550 | Moore | Dec. 11, 1945 |
| 2,433,176 | Van Epps | Dec. 23, 1947 |
| 2,448,173 | Cowan | Aug. 31, 1948 |
| 2,510,383 | Dalgleish | June 6, 1950 |